(12) United States Patent
Viitamäki

(10) Patent No.: US 9,470,419 B2
(45) Date of Patent: Oct. 18, 2016

(54) COMBUSTION CHAMBER

(71) Applicant: RMV Tech Oy, Koskenkorva (FI)

(72) Inventor: Markus Viitamäki, Koskenkorva (FI)

(73) Assignee: RMV TECH OY, Koskenkorva (FI)

( * ) Notice: Subject to any disclaimer, the term of this patent is extended or adjusted under 35 U.S.C. 154(b) by 366 days.

(21) Appl. No.: 14/356,990

(22) PCT Filed: Nov. 22, 2012

(86) PCT No.: PCT/FI2012/051157
§ 371 (c)(1),
(2) Date: May 8, 2014

(87) PCT Pub. No.: WO2013/076371
PCT Pub. Date: May 30, 2013

(65) Prior Publication Data
US 2014/0318129 A1    Oct. 30, 2014

(30) Foreign Application Priority Data
Nov. 25, 2011   (FI) ...................................... 20116184

(51) Int. Cl.
*F23R 3/12* (2006.01)
*F23R 3/44* (2006.01)
(Continued)

(52) U.S. Cl.
CPC ................ *F23R 3/12* (2013.01); *F23C 3/006* (2013.01); *F23L 15/00* (2013.01); *F23R 3/06* (2013.01); *F23R 3/28* (2013.01); *F23R 3/44* (2013.01);
(Continued)

(58) Field of Classification Search
CPC .............. F23R 3/12; F23R 3/28; F23R 3/06; F23R 3/44; F23R 3/58; F23R 2900/03043; F23C 3/006; F23L 15/00
See application file for complete search history.

(56) References Cited

U.S. PATENT DOCUMENTS 2,097,255 A * 10/1937 Saha ......................... F23C 9/00
                                                   110/342
2,398,654 A *  4/1946 Lubbock ................. F23C 99/00
                                                    60/755
(Continued)

FOREIGN PATENT DOCUMENTS

KR       100938555 B1    1/2010

OTHER PUBLICATIONS

Search Report issued in Finnish Application No. 20116184 issued Oct. 23, 2012 (with translation).
(Continued)

*Primary Examiner* — Ted Kim
(74) *Attorney, Agent, or Firm* — Hoffmann & Baron, LLP

(57) ABSTRACT

The invention relates to a combustion chamber for burning an air-fuel mixture, a gas mixture or a gas-liquid mixture, including an outer casing; a flame tube located inside the outer casing and provided with an inner space, whereby the outer casing and the flame tube form an annular channel therebetween, the flame tube including flow apertures which penetrate through its casing and interconnect the annular channel and the inner space of the flame tube; a cover part arranged in inlet ends of the outer casing and the flame tube and provided with flow apertures opening up into the annular channel; a combustion air inlet part which is arranged in an outer surface of the cover part and which is in connection with the flow apertures of the cover part; a fuel jet located in the cover part and extending inside the flame tube for feeding fuel into the flame tube.

4 Claims, 3 Drawing Sheets

(51) Int. Cl.
    *F23R 3/58*     (2006.01)
    *F23L 15/00*     (2006.01)
    *F23R 3/06*     (2006.01)
    *F23R 3/28*     (2006.01)
    *F23C 3/00*     (2006.01)

(52) U.S. Cl.
    CPC ........ *F23R 3/58* (2013.01); *F23R 2900/03043* (2013.01)

(56) References Cited

U.S. PATENT DOCUMENTS

| | | | | |
|---|---|---|---|---|
| 2,569,446 A | * | 10/1951 | Bonvillian | F23R 3/08 60/757 |
| 2,579,614 A | * | 12/1951 | Ray | F23R 3/12 60/746 |
| 2,593,523 A | * | 4/1952 | Bauger | F02C 5/10 60/39.38 |
| 2,638,745 A | * | 5/1953 | Nathan | F23R 3/54 60/755 |
| 3,902,316 A | * | 9/1975 | Huellmantel | F23R 3/26 60/794 |
| 4,215,535 A | | 8/1980 | Lewis | |
| 4,504,213 A | * | 3/1985 | Markus | F23C 7/06 60/760 |
| 6,079,974 A | * | 6/2000 | Thompson | F23C 9/00 110/104 R |
| 2003/0013053 A1 | | 1/2003 | Dutescu et al. | |
| 2006/0218932 A1 | | 10/2006 | Pfefferle | |

OTHER PUBLICATIONS

International Search Report issued in International Application No. PCT/FI2012/051157 mailed Mar. 6, 2013.
International Preliminary Report on Patentability issued in International Application No. PCT/FI2012/051157 issued Dec. 17, 2013.
Supplementary European Search Report for corresponding European Patent Application No. EP12850878, pp. 1-4 (Jul. 30, 2015).

\* cited by examiner

COMBUSTION CHAMBER

BACKGROUND OF THE INVENTION

The invention relates to a combustion chamber for burning an air-fuel mixture, a gas mixture or a gas-liquid mixture, comprising an outer casing provided with an inner space, an inlet end and an outlet end, whereby the inner space tapers towards the outlet end over a determined section of the length of the casing; a flame tube located in the inner space of the outer casing and provided with an inner space, an inlet end and an outlet end on sides corresponding to those of the inlet end and the outlet end of the outer casing, whereby the flame tube tapers towards its outlet end over a determined section of the length of the flame tube, and whereby an inner surface of the outer casing and an outer surface of the flame tube form an annular channel therebetween, the flame tube comprising flow apertures which penetrate through its casing and interconnect the annular channel and the inner space of the flame tube; a cover part arranged in the inlet ends of the outer casing and the flame tube and provided with flow apertures opening up into the annular channel; a combustion air inlet part which is arranged in an outer surface of the cover part and which is in connection with the flow apertures of the cover part; a fuel jet located in the middle of the cover part and extending inside the flame tube for feeding fuel into the flame tube; and an outlet part arranged in the outlet ends of the outer casing and the flame tube and provided with an outlet channel connected to the outlet end of the flame tube.

In a conventional "can-type" combustion chamber, combustion air is conveyed to an annular channel located between the outer casing and the flame tube either directly or via a diffuser and therefrom into the flame tube via the flow apertures in its casing.

The problem with the prior art combustion chamber is that with respect to flow technology, the feed of combustion air into the chamber is not very good.

SUMMARY OF THE INVENTION

An object of the invention is thus to provide a novel combustion chamber for enabling the above-mentioned problems to be solved. This object is achieved by the combustion chamber which is mainly characterized in that the combustion air inlet part comprises an inlet channel whose initial part is located substantially perpendicularly and eccentrically with respect to a longitudinal axis of the combustion chamber and which continues on a surface of the cover part spirally towards an end of the channel such that its volume decreases, and whereby a side of the inlet channel facing the cover part is in connection with the flow apertures of the cover part, and that the flow apertures of the flame tube are formed by means of protrusions which project radially from the flame tube and in which the flow apertures are located substantially perpendicularly against a combustion air flow coming spirally from the flow apertures of the cover part.

This structure provides a strong vortical inflow of combustion air into the annular channel and therefrom further to the flame tube, wherein the vortical flow continues. This improves and enhances the burning of the fuel fed to the flame tube. Simultaneously, it is possible to significantly improve the efficiency of a turbine typically associated with the combustion chamber and reduce flue gas emissions. Owing to the shaped flow apertures of the flame tube, the combustion air moves efficiently inside the flame tube while at the same time the vorticity of the combustion air remains or further increases, efficiently mixing up the combustion air and the fuel. Conventionally, these flow apertures or discharge channels have simply been mere holes cut in the casing of the flame tube.

Preferably, the flow apertures of the cover part are separated from one another by flow control wings located obliquely with respect to the longitudinal axis of the combustion chamber. These control wings enable the inflow of combustion air to be fine-adjusted as desired.

LIST OF FIGURES

The invention is now described in closer detail by means of one preferred embodiment and with reference to the attached drawings, in which FIG. 1 generally shows a gas turbine system;

DETAILED DESCRIPTION OF THE INVENTION

Figure 1:
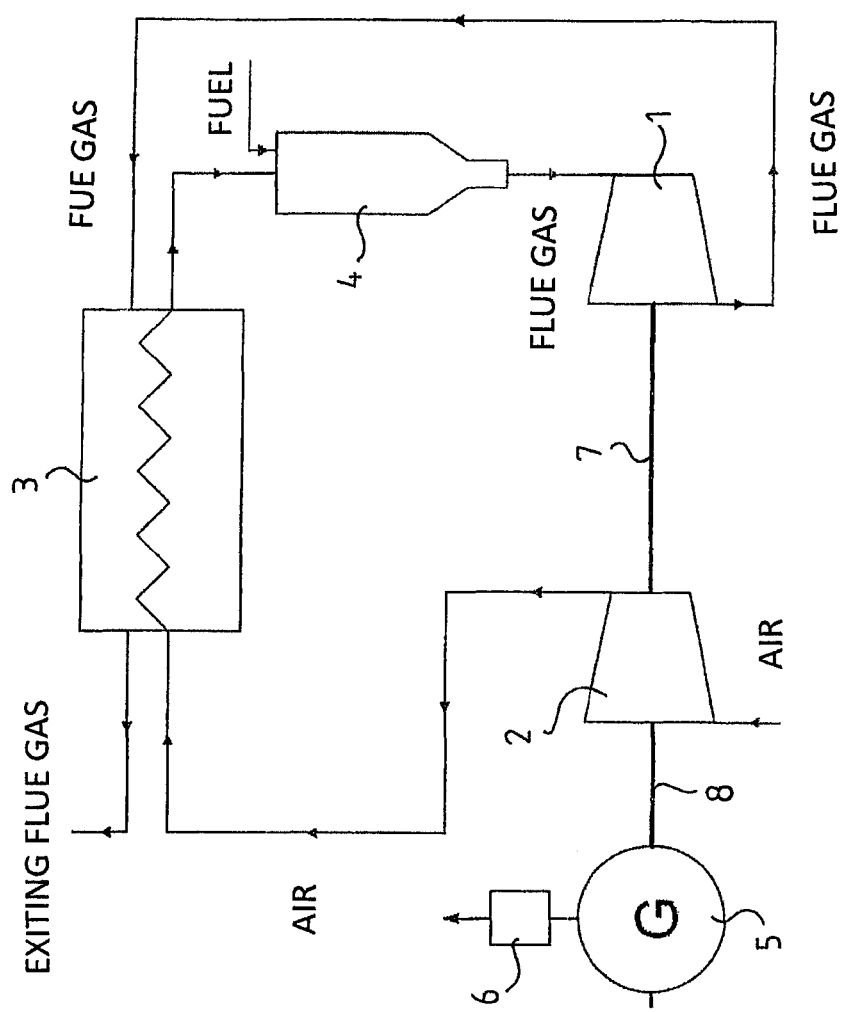

FIG. 1 schematically shows a gas turbine system for producing electric energy, the combustion chamber according to the invention being particularly suitable for the system. As its main components, this system comprises a turbine 1, a compressor 2, a heat exchanger 3, a combustion chamber 4, a generator 5, and a frequency converter 6.

A runner wheel of the turbine 1 and the compressor 2 are connected to the same shaft 7, and the generator 5 is connected by an intermediate shaft 8 to an entity formed by the turbine 1 and the compressor 2. The compressor 2 compresses inlet air it has taken and blows the compressed air to the heat exchanger 3 to be pre-heated. The pre-heated air is conveyed to the combustion chamber 4, whereto fuel is also fed. A mixture of air and fuel burns in a flame tube located inside the combustion chamber 4 and advances therefrom as a flue gas flowing at a high speed, rotating the runner wheel of the turbine 1. The runner wheel of the turbine 1, in turn, rotates the compressor 2 and the generator 5. After the turbine 1, the pressure of the flue gas drops close to air pressure, but it still contains a lot of heat energy which is conveyed back to the heat exchanger 3 in order to carry out the aforementioned pre-heating.

Figure 2:
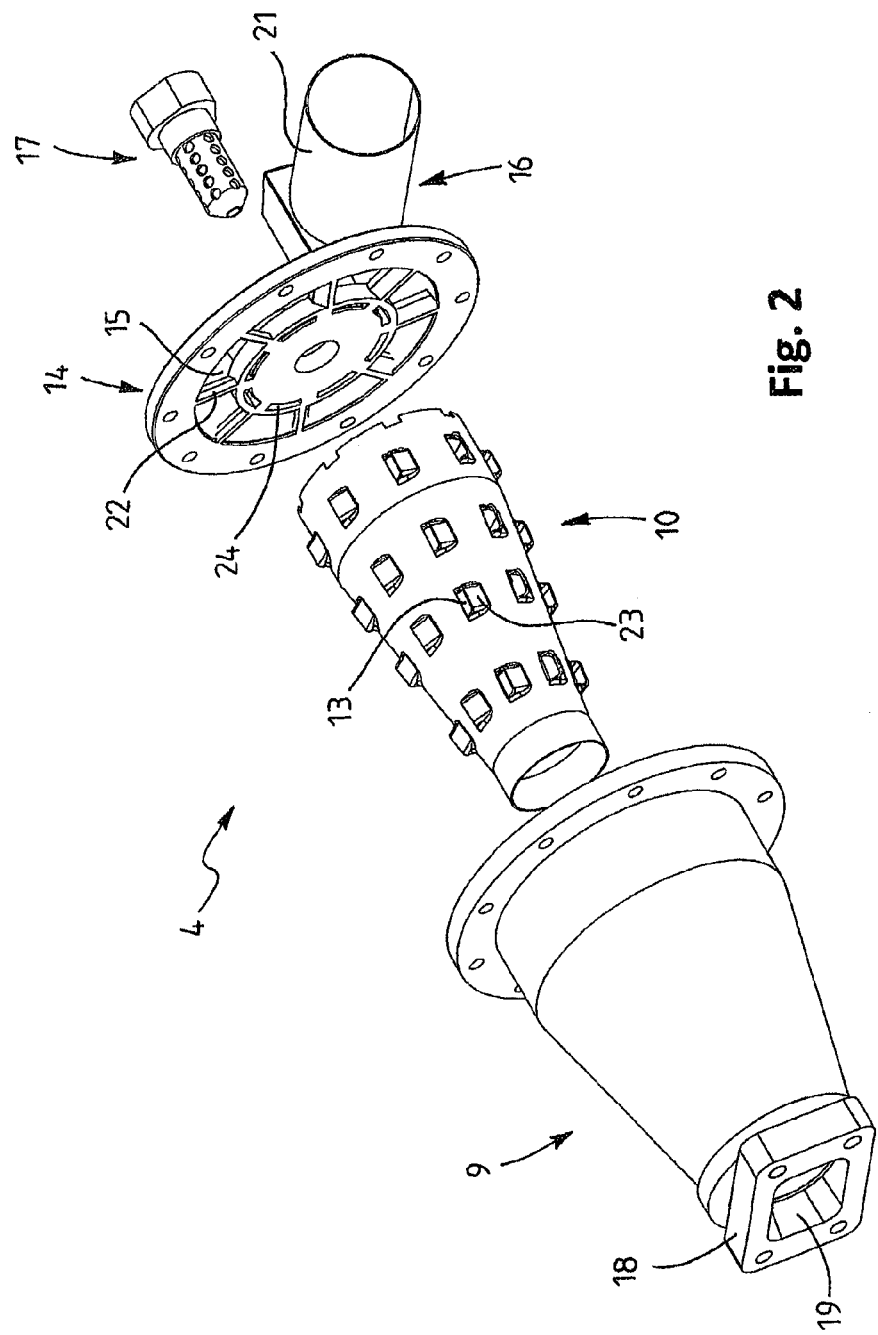
FIG. 2 is an explosive view of a combustion chamber according to the invention.
Figure 3:
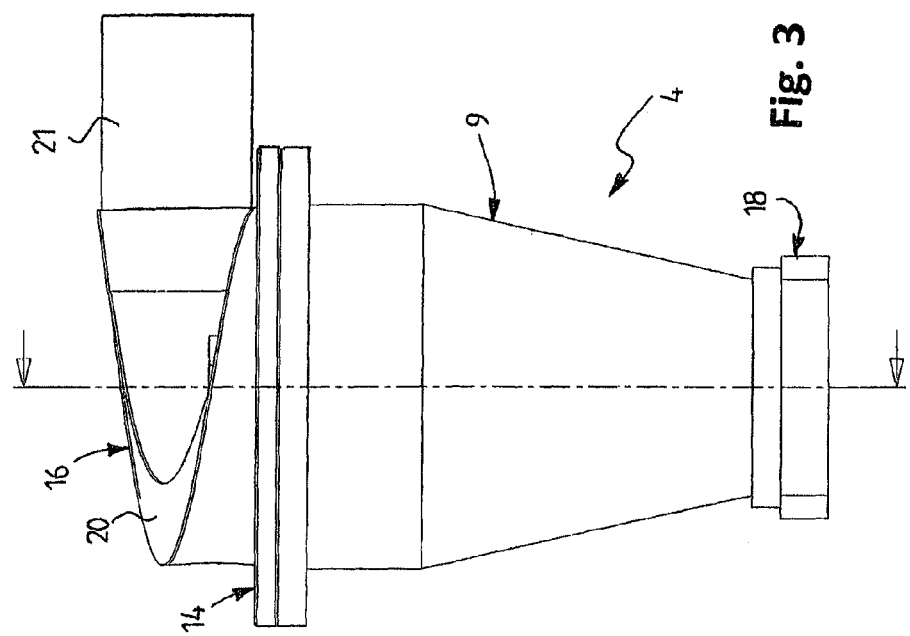
FIG. 3 is a top view of the combustion chamber according to FIG. 1, assembled.
Figure 4:
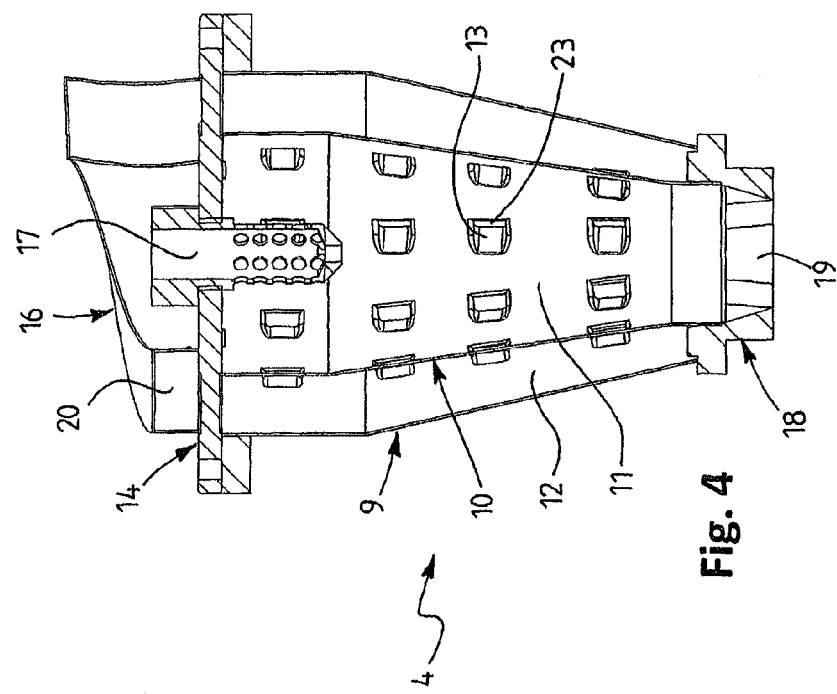
FIG. 4 is a longitudinally sectional view taken from FIG. 3 of the heat exchanger according to FIG. 1, assembled.

Referring next to FIGS. 2 to 4, the combustion chamber 4 according to the invention comprises, firstly, an outer casing 9 provided with an inner space, an inlet end and an outlet end, whereby the inner space tapers towards the outlet end over a chosen section of the length of the casing 9 (herein over a distance which is about ⅔ of the length of the outer casing).

A second essential element of the combustion chamber is a flame tube 10 which is located in the inner space of the outer casing 9 and which is provided with an inner space 11, an inlet end and an outlet end on sides corresponding to those of the inlet end and the outlet end of the outer casing. The inner space of the outer casing 9, the flame tube 10 and its inner space 11 are preferably substantially rotationally symmetrical, although other geometrically determined shapes may also be feasible (e.g. a polygon). The flame tube 10 tapers towards its outlet end over a chosen section of the length of the flame tube 10 (herein over a distance which is about ¾ of the length of the flame tube), whereby an inner surface of the outer casing 9 and an outer surface of the flame tube 10 form an annular channel 12 therebetween. In such a case, the outer casing 9 and the flame tube 10 are also mutually coaxial. The flame tube 10 is provided with flow apertures 13 which penetrate through its casing and interconnect the annular channel 12 and the inner space 11 of the flame tube 9.

The inlet ends of the outer casing 9 and the flame tube 10 are closed by a cover part 14 provided with flow apertures 15 which open up into the annular channel 12. An outer surface of the cover part 14 is provided with a combustion air inlet part 16 which is in connection with the flow apertures 15 of the cover part 14. A fuel jet 17, in turn, is located in the middle of the cover part 14, extending inside the flame tube 10 in order to feed fuel to the flame tube 10. To the outlet ends of the outer casing 9 and the flame tube 10, an outlet part 18 is fastened which is provided with an outlet channel 19 connected to the outlet end of the flame tube 10.

It is essential for the invention and the structure now to be described that the combustion air inlet part 16 comprises an inlet channel 20 whose initial part 21 is located substantially perpendicularly and eccentrically with respect to the longitudinal axis of the combustion chamber and which continues on the surface of the cover part 14 spirally towards the end of the channel such that its volume decreases, and whereby the side of the inlet channel 20 facing the cover part is in connection with the flow apertures 15 of the cover part 14. This already ensures the above-described conveyance of vortical combustion air flow to the annular channel 12 and the flame chamber 10.

For fine-adjusting the combustion air flow, the flow apertures 15 of the cover part 14 are separated from one another by flow control wings 22 located obliquely with respect to the longitudinal axis of the combustion chamber.

In order to enhance the control of the combustion air flow to the flame tube 10, its flow apertures 13 are formed by means of protrusions 23 projecting radially from the flame tube 10, in which the flow apertures 13 are located substantially perpendicularly against the combustion air flow coming spirally from the flow apertures 15 of the cover part 14.

The inner surface of the cover part 14, on the side facing the inner space 11 of the flame tube 10, is further provided with circumferentially located channels 24 which penetrate through the cover part 14 for the purpose of serving as a by-pass flow channel system in order to ensure complete mixing of the air-fuel mixture at the initial end of the inner space 11 of the flame tube 10.

The above description of the invention is only intended to illustrate the basic idea according to the invention. A person skilled in the art may thus vary its details within the scope of the accompanying claims.

The invention claimed is:

1. A combustion chamber in a gas turbine system for burning an air-fuel mixture, a gas mixture or a gas-liquid mixture, comprising: an outer casing provided with an inner space, an inlet end and an outlet end, whereby the inner space tapers towards the outlet end over a determined section of the length of the casing;
    a flame tube located in the inner space of the outer casing and provided with an inner space, an inlet end and an outlet end on sides corresponding to those of the inlet end and the outlet end of the outer casing, whereby the flame tube tapers towards its outlet end over a determined section of the length of the flame tube, and whereby an inner surface of the outer casing and an outer surface of the flame tube form an annular channel therebetween, the flame tube comprising flow apertures which penetrate through its casing and interconnect the annular channel and the inner space of the flame tube;
    a cover part arranged in the inlet ends of the outer casing and the flame tube and provided with flow apertures opening up into the annular channel;
    a combustion air inlet part which is arranged in an outer surface of the cover part and which is in connection with the flow apertures of the cover part;
    a fuel jet located in the middle of the cover part and ex-tending inside the flame tube for feeding fuel into the flame tube; and
an outlet part which is arranged in the outlet ends of the outer casing and the flame tube and which is provided with an outlet channel connected to the outlet end of the flame tube,
    wherein the combustion air inlet part comprises an inlet channel whose initial part is located substantially perpendicularly and eccentrically with respect to a longitudinal axis of the combustion chamber and which continues on a surface of the cover part spirally towards an end of the channel such that its volume decreases, and whereby a side of the inlet channel facing the cover part is in connection with the flow apertures of the cover part, and that the flow apertures of the flame tube are formed by means of protrusions which project radially from the flame tube and in which the flow apertures of the flame tube are located substantially perpendicularly against a combustion air flow coming spirally from the flow apertures of the cover part.

2. A combustion chamber as claimed in claim 1, wherein the flow apertures of the cover part are separated from one another by flow control wings located obliquely with respect to the longitudinal axis of the combustion chamber.

3. A combustion chamber as claimed in claim 1, wherein the inner space of the outer casing, the flame tube and its inner space are substantially rotationally symmetrical.

4. A combustion chamber as claimed in claim 2, wherein the inner space of the outer casing, the flame tube and its inner space are substantially rotationally symmetrical.

* * * * *